(12) United States Patent
Wang et al.

(10) Patent No.: US 8,737,778 B2
(45) Date of Patent: May 27, 2014

(54) SMALL FORM FACTOR VARIABLE OPTICAL ATTENUATOR WITH CLADDING MODE SUPPRESSING FIBER

(75) Inventors: Zhongjian Wang, Shenzhen (CN); Michael Ayliffe, Ottawa (CA); Qinrong Yu, San Jose, CA (US); Niki Liu, Shenzhen (CN); Rongtang Fan, Shenzhen (CN)

(73) Assignee: JDS Uniphase Corporation, Milpitas, CA (US)

( * ) Notice: Subject to any disclaimer, the term of this patent is extended or adjusted under 35 U.S.C. 154(b) by 195 days.

(21) Appl. No.: 13/336,916

(22) Filed: Dec. 23, 2011

(65) Prior Publication Data

US 2013/0163923 A1    Jun. 27, 2013

(51) Int. Cl.
 *G02B 6/32* (2006.01)

(52) U.S. Cl.
 USPC .................................. 385/33; 385/124; 372/6

(58) Field of Classification Search
 USPC ...................... 385/12, 33, 124; 372/6; 348/65
 See application file for complete search history.

(56) References Cited

U.S. PATENT DOCUMENTS

| | | | | |
|---|---|---|---|---|
| 4,877,306 | A | 10/1989 | Kar | 385/128 |
| 5,241,613 | A | 8/1993 | Li et al. | 385/78 |
| 6,137,941 | A | 10/2000 | Robinson | 385/140 |
| 6,498,888 | B1 | 12/2002 | Chenard et al. | 385/127 |
| 6,510,261 | B2 | 1/2003 | Sorin et al. | 385/27 |
| 6,538,816 | B2 | 3/2003 | Fuchs et al. | 359/578 |
| 7,295,748 | B2 | 11/2007 | Chen et al. | 385/140 |
| 2005/0024716 | A1* | 2/2005 | Nilsson et al. | 359/341.31 |
| 2011/0026106 | A1* | 2/2011 | Nakaguma et al. | 359/341.1 |
| 2011/0142083 | A1* | 6/2011 | Tanigawa et al. | 372/6 |
| 2011/0205349 | A1* | 8/2011 | Li | 348/65 |
| 2011/0317132 | A1* | 12/2011 | Nakamura | 353/31 |
| 2012/0257644 | A1* | 10/2012 | Sakamoto | 372/6 |

OTHER PUBLICATIONS

Lee et al., "Effect of Air Hole Size on Transmission Characteristics of Fiber Bragg Gratings Written in Holey Fiber,", *Optical Fiber Communication Conference and Exposition and The National Fiber Optic Engineers Conference*, Technical Digest (CD) (Optical Society of America, 2006), paper OWI1.

Fini, "Suppression of higher-order modes in aircore microstructure fiber designs", Lasers and Electro-Optics, 2006 and 2006 Quantum Electronics and Laser Science Conference. CLEO/QELS 2006, pp. 1-2, May 21-26, 2006.

Abe et al., "Modal Interference in a Short Fiber Section: Fiber Length, Splice Loss, Cutoff, and Wavelength Dependencies", Journal of Lightwave Technology, vol. 10, No. 4, Apr. 1992.

www.nufern.com "Cladding Mode Suppressed Photosensitive Single-Mode Fiber" downloaded Dec. 22, 2011.

www.nufern.com "Cladding Mode Free, Photosensitive Single-Mode Fiber" downloaded Dec. 22, 2011.

www.stockeryale.com "Low-Loss Cladding Mode Suppression Fiber" downloaded Dec. 22, 2011.

www.coractive.com "Attenuating Fibers—HAF Series" downloaded Dec. 22, 2011.

* cited by examiner

*Primary Examiner* — Ellen Kim

(74) *Attorney, Agent, or Firm* — Matthew A. Pequignot; Pequignot + Myers LLC

(57) ABSTRACT

The invention relates to an electro-static variable optical attenuator suitable for use in a small form factor pluggable module. A short cladding suppressing fiber, such as a double clad optical fiber, dissipates attenuated light coupled to the cladding to reduce modal interference in the output light, while also reducing PDL and WDL introduced by the off set attenuation mechanism.

5 Claims, 12 Drawing Sheets

~20mm

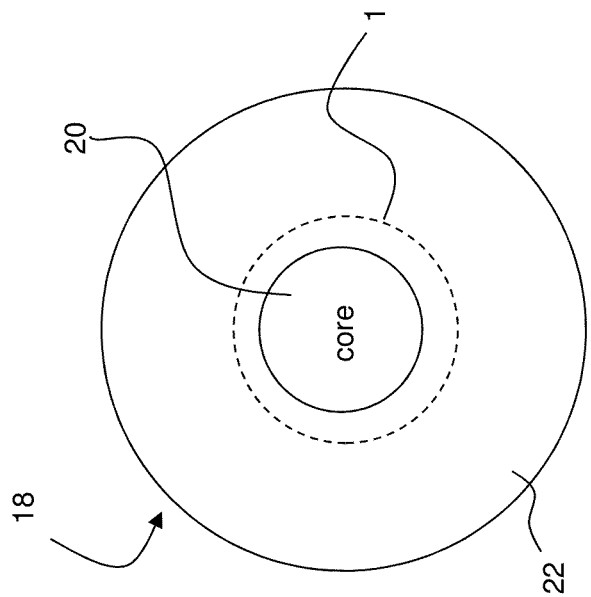
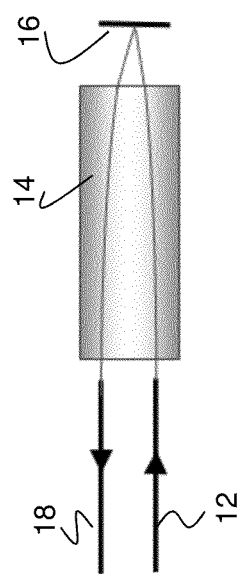
Fig. 1B
Prior Art

Fig. 6

| Sample # | SFP VOA with SFM28 fiber - PDL at 23degC (dB) | | |
|---|---|---|---|
| | ATTN=0dB | ATTN=10dB | ATTN=20dB |
| #1 | 0.40 | 0.45 | 1.08 |
| #2 | 0.38 | 0.28 | 1.19 |
| #3 | 0.47 | 0.34 | 1.11 |
| #4 | 0.43 | 0.29 | 0.77 |
| #5 | 0.30 | 0.36 | 0.75 |

Fig. 7

| Sample# | Parameter | Temp (C) | SFP VOA with Double Clad fiber – IL, PDL over temperature (dB) | | |
|---|---|---|---|---|---|
| | | | ATTN=0dB | ATTN=10dB | ATTN=20dB |
| 137928 | IL | 70 | 0.70 | -- | -- |
| | | 23 | 0.70 | -- | -- |
| | | -5 | 0.83 | -- | -- |
| | PDL | 70 | 0.05 | 0.16 | 0.30 |
| | | 23 | 0.05 | 0.19 | 0.39 |
| | | -5 | 0.08 | 0.24 | 0.38 |
| 1372 | IL | 70 | 0.78 | -- | -- |
| | | 23 | 0.68 | -- | -- |
| | | -5 | 0.69 | -- | -- |
| | PDL | 70 | 0.05 | 0.14 | 0.21 |
| | | 23 | 0.05 | 0.10 | 0.23 |
| | | -5 | 0.06 | 0.12 | 0.32 |

SMALL FORM FACTOR VARIABLE OPTICAL ATTENUATOR WITH CLADDING MODE SUPPRESSING FIBER

FIELD OF THE INVENTION

This invention relates generally to a variable optical attenuator integrated into a small form factor module including a short double clad fiber to suppress cladding modes and reduce polarization dependent loss (PDL) and wavelength dependent loss (WDL).

BACKGROUND OF THE INVENTION

Variable Optical Attenuators (VOAs) are common components used in optical communication networks. One common VOA technology is based on an Electro-Static (ES) Micro-Electro-Mechanical (MEMS) chip. The ES-VOA component has an input optical fiber, a lens, a MEMS tilting mirror and an output optical fiber. The lens focuses the input light onto the MEMS tilting mirror, and the reflected light is directed towards the output fiber. A voltage is applied to the MEMS chip, the voltage amplitude controls the mirror tilt angle. By varying the voltage and minor tilt angle, the position of the reflected spot on the output fiber is varied. With the output spot aligned to the center of output fiber core, the attenuation is minimum and limited only by the insertion loss (typically ~0.5 dB). As the output spot of the beam of reflected light is misaligned relative to the output fiber core, the amount of light launched into the output fiber core is reduced (attenuated), and correspondingly more light is launched into the fiber cladding, and a higher level of attenuation is achieved. The maximum attenuation can be 30 dB and higher, mainly limited by the tilt range of the mirror.

There exist multiple other VOA technologies, each have advantages and disadvantages. Examples include motor-controlled vane attenuator, thermal MEMS-controlled attenuator, Mach-Zehnder attenuators, Electro-Absorption attenuators, liquid-crystal attenuators. The main advantages of the ES-VOA is rapid switching time (<2 ms), compact size (5.56 mm diameter package), low cost, low power dissipation, and high dynamic range (>30 dB). These advantages have made the ES-VOA the most common VOA solution in optical fiber networks applications.

When using VOAs in Dense Wavelength Division Multiplexing (DWDM) optical networks, there are two critical performance parameters that must be minimized: wavelength-dependent loss (WDL) and the polarization-dependent loss (PDL). The WDL refers to the variation in attenuation loss over the specified wavelength range. The PDL refers to the variation in attenuation loss over all states of input polarization. In a VOA, WDL and PDL can vary as a function of the attenuation level. WDL and PDL are undesirable because they contribute to increasing differences in optical power between wavelength channels, which in turn increases the need for channel power equalization and increases the cost and complexity of optical networks. Various design approaches have been proposed to reduce WDL in ES-VOA, see for example U.S. Pat. No. 7,295,748.

In a further development the ES-VOA component is packaged inside a Small Form factor Pluggable (SFP) housing. This product is referred to as SFP VOA. The SFP VOA offers several advantages compared to the stand-alone pigtailed ES-VOA component described above: (1) the SFP VOA is pluggable, the customer can gradually populate SFP VOA slots on the host system board as the system capacity is increased, (2) the SFP VOA pluggability allows for easy replacement, (3) no fiber management is required since the SFP VOA is connectorized, (4) the interface is digital and the attenuation level is set by a firmware instruction from the host board, the customer does not need to design control and drive hardware and does not need to know the specific characteristics of the ES-VOA component.

However, compared to the stand-alone pigtailed ES-VOA, the SFP VOA suffers from higher WDL and higher PDL. The inventors have investigated the possibility that this may be caused by modal interference between the fundamental mode and co-propagating cladding modes launched in the output fiber.

U.S. Pat. No. No. 6,498,888 issued Dec. 24, 2002 to the Institut National D'Optique, discloses a high attenuation fiber with cladding mode suppression. The attenuation mechanism in this disclosure is a cobalt doped core. A double clad fiber absorption attenuator is used to suppress cladding modes. Because the fiber is short, it can support light propagation in high order modes over its short length. When the short fiber attenuator is coupled (spliced) to a fiber, most of the light (e.g. 99%) is launched into the lowest order mode of the short fiber, but because of misalignment some light will be launched in some higher order modes. When the fiber is spliced again through misalignment these high order modes can be coupled back into the core where they would interfere with the lowest order mode. The misalignment in the splice joints is small, and therefore very little light is coupled into a cladding mode. This small amount of cladding modes is suppressed by the double clad fiber.

In a SFP VOA operating at high attenuation, the majority of the light (>99%) will be propagating in the cladding modes, whereas in the application described in U.S. Pat. No. 6,498,888 the majority of the light (>99%) is propagating in the fiber fundamental mode. It is not clear from the teaching of the prior art that a double clad fiber will work to eliminate modal noise where the attenuation is achieved by coupling large amounts of light in the fiber cladding by the ES-VOA. This large amount of light propagating in the cladding mode can couple back into the core of the single mode output fiber and interfere with light that propagated in the fiber lowest order mode resulting in modal noise.

Furthermore, the absorptive attenuation means of the 4,498,888 patent is polarization independent. This offers no teaching for mitigating the PDL degradation experienced by the SFP VOA. There are two factors that contribute to PDL degradation in the SFP VOA. The first factor relates to the variations in polarization states of the cladding modes. As the attenuation is increased, there is increasing optical power in the cladding modes, and since the propagation of cladding modes is not guided, this results in the cladding modes having a variety of polarization states. Accordingly, the amplitude of the modal interference at the core-to-core (between low-order mode in the core and high-order cladding modes) will vary as a function of the cladding modes polarization states, thereby increasing PDL. At high attenuation, given that most of the optical power is in the cladding modes, this effect leads to significant PDL degradation. A second factor is related to the polarization-dependent coupling of the light reflected from the minor coupling into the core. As the attenuation is increased, the beam offset increases, and it would be expected that the coupling of the light into the core would be different depending on whether the input polarization is parallel to the offset plane versus perpendicular to the offset plane. This difference in coupling would also contribute to PDL degradation.

Given the advantages of the SFP-VOA it is highly desirable to mitigate the PDL and WDL in a SFP-VOA device.

SUMMARY OF THE INVENTION

The present invention has found that by suppressing cladding modes using a cladding mode suppressing fiber for the output fiber of a SFP VOA, a negligible degradation in WDL and PDL can be achieved within a short fiber length.

Accordingly, the present invention comprises a variable optical attenuator comprising:
a mirror supported to assume a variable range of positions; a lens; an input optical fiber for transmitting light comprising an optical signal through the lens to the mirror; an output optical fiber for receiving light reflected from the minor and focused through the lens comprising a cladding mode suppressing fiber; an electro-static actuator for controlling a position of the minor such that a selected portion of light from the minor is focused through the lens into a core of the output optical fiber, while a remaining portion of the light reflected from the mirror is coupled into the inner cladding of the output optical fiber, in dependence on the position of the mirror.

The invention is further defined wherein the output optical fiber is less than 100 cm and greater than 15 mm, or wherein the output optical fiber is 15-60 mm.

The invention is further defined wherein the output optical fiber comprises a double clad fiber having a core, an inner cladding and an outer cladding, the core having a higher index of refraction than the inner cladding, and the outer cladding having a higher index of refraction than the inner cladding.

In a further preferred embodiment the invention includes an input optical fiber comprising a cladding mode suppressing fiber.

In a preferred embodiment the invention provides that the variable optical attenuator is housed in a small form factor module.

In a further embodiment of the invention the input optical fiber comprises a double clad fiber having a core, an inner cladding and an outer cladding, the core having a higher index of refraction than the inner cladding, and the outer cladding having a higher index of refraction than the inner cladding.

The invention is further defined wherein the minor comprises a semiconductor micro-electro-mechanical device.

The invention is further defined wherein the variable optical attenuator can provide an attenuation range between 0-30 dB.

BRIEF DESCRIPTION OF THE DRAWINGS

Exemplary embodiments of the invention will now be described in accordance with the drawings, in which:

FIG. 1B is a schematic illustration of an output fiber end with a spot representing the beam of light focused on the fiber core;

FIG. 6 is a table showing PDL data measured on SFP VOA prototypes constructed with standard SMF28 fibers; and FIG. 7 is a table showing PDL data measured on a SFP VOA prototypes constructed with double clad fibers.

DETAILED DESCRIPTION

Figure 1A:
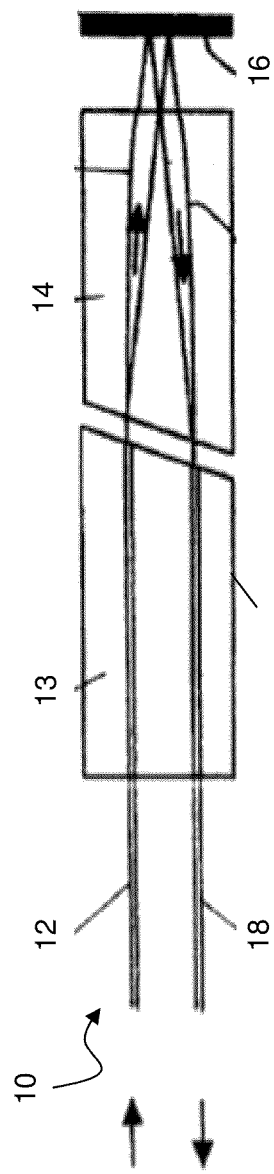
FIG. 1A is a schematic cross-section of a prior art electro-static variable optical attenuator.
Figure 1C:
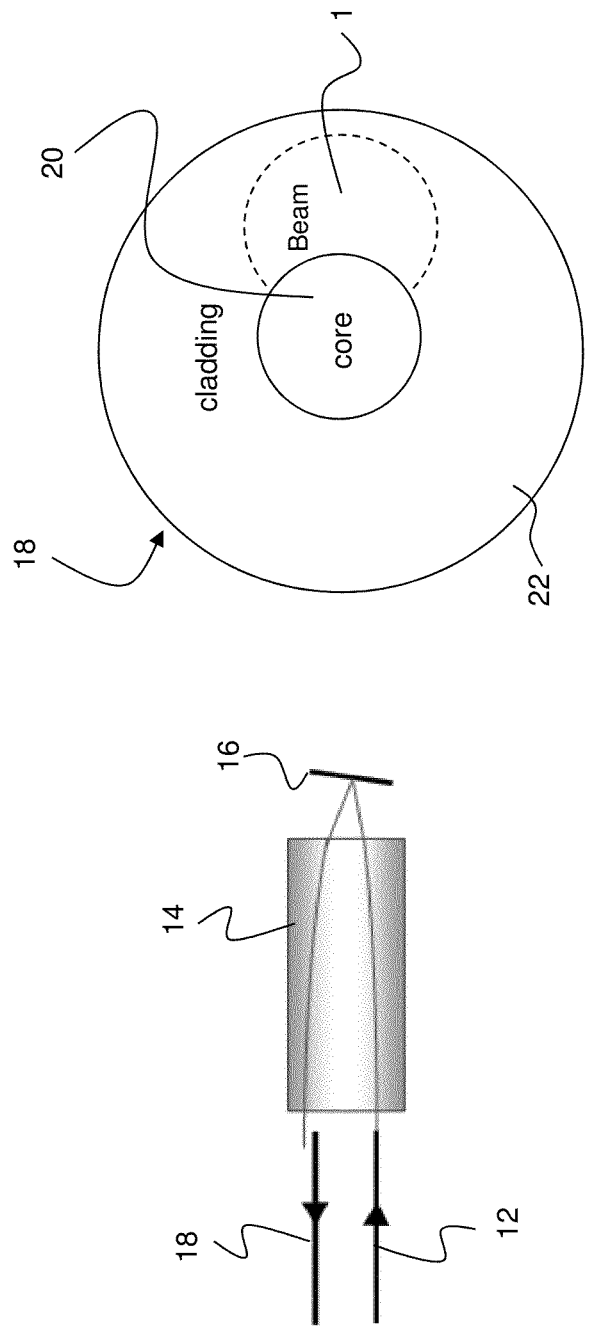
FIG. 1C is a schematic illustration of an output fiber end with a spot representing the beam of light focused at an offset position relative to the fiber core to achieve high attenuation.

A prior art VOA technology based on a Electro-Static (ES) Micro-Electro-Mechanical (MEMS) chip, is illustrated in FIG. 1A. The ES-VOA component 10 has an input optical fiber 12, a lens 14, a MEMS tilting minor 16 and an output optical fiber 18. The lens 14 focuses the input light onto the MEMS tilting minor 16, the reflected light is directed towards the output fiber 18. Input optical fiber 12 and output optical fiber 18 are supported in ferrule 13. A voltage is applied to the MEMS chip, and the voltage amplitude controls the mirror tilt angle. By varying the voltage and minor tilt angle, the position of the reflected spot on the output fiber is varied. With the output spot aligned to the center of output fiber core, shown in FIG. 1B, the attenuation is minimum and limited only by the insertion loss (typically ~0.5 dB). As the output spot 1, of the beam of reflected light, is misaligned relative to the output fiber core 20, as seen in FIG. 1C, the amount of light launched into the output fiber core 20 is reduced (attenuated), and correspondingly more light is launched into the fiber cladding 22, and a higher level of attenuation is achieved. The maximum attenuation can be 30 dB and higher, mainly limited by the tilt range of the mirror 16.

In a typical application, the ES-VOA 10 will use standard singlemode fiber (e.g. Corning SMF28) for both input and output fibers. The length of the fiber pigtails are typically around 1 meter. Under high attenuation state (>20 dB), most of the light (>99%) will be launched in the fiber cladding where it will propagate in various higher order optical modes referred to as cladding modes. Over the 1m length of the fiber pigtail, the cladding modes will diffuse away from the core and cladding light is eventually absorbed by the fiber outer layer. This means that at the fiber splice location at the end of the pigtail, there is negligible cladding mode that can couple back into the fiber core and therefore negligible modal interference effects that would degrade WDL and PDL.

Figure 2:
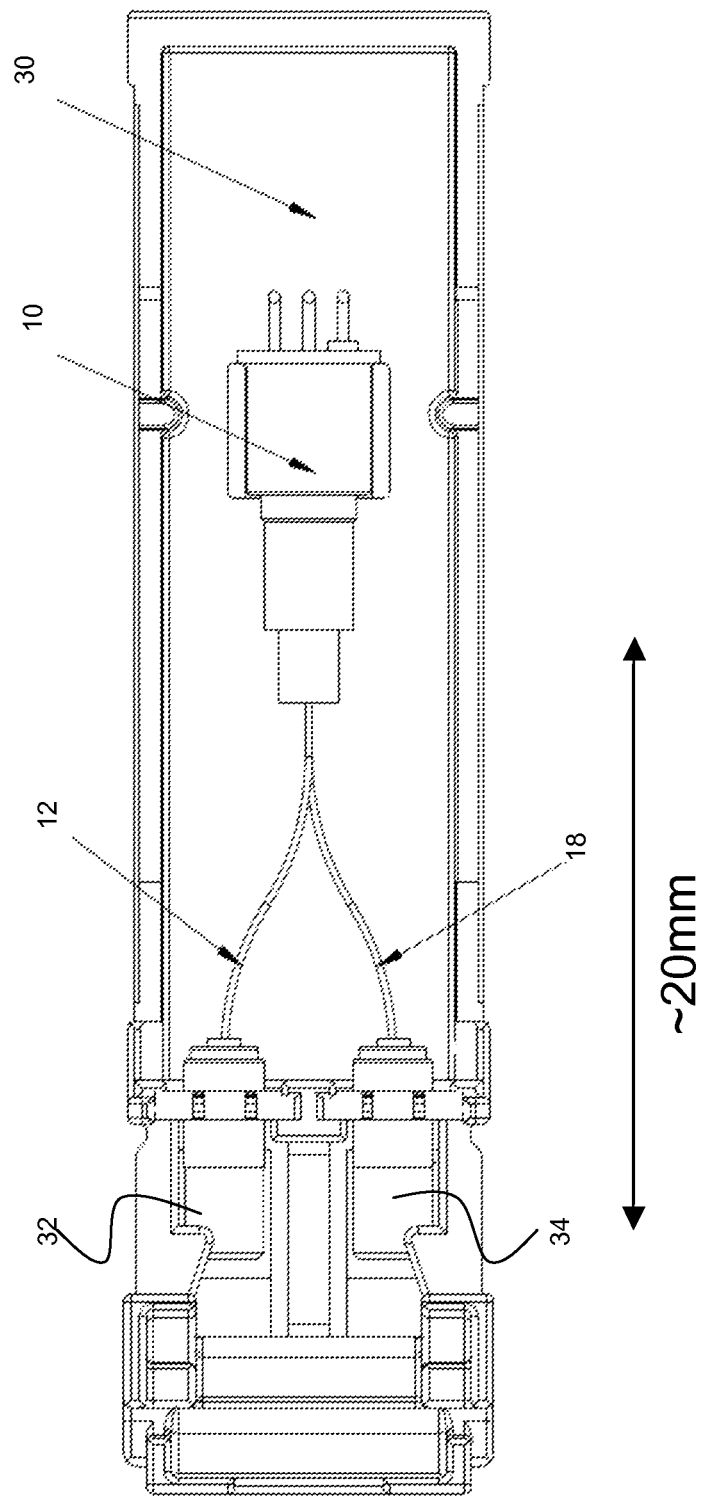
FIG. 2 is a top view of a prior art small form factor pluggable variable optical attenuator.

FIG. 2 below illustrates a prior art application where the ES-VOA component 10 is packaged inside a Small Form factor Pluggable (SFP) housing 30. This product is referred to as SFP VOA. The SFP housing 30 integrates a Printed-Circuit-Board Assembly (PCBA, not shown in FIG. 2) with electronic circuits to drive the ES-VOA MEMS chip and includes a microcontroller to store calibration information and allow for a digital communication interface with the host system. The PCBA plugs into an electrical edge connector on the host board. The SFP housing 30 has input 32 and output 34 optical ports, where a LC duplex fiber connector can be inserted into fiber receptacles 32 and 34 to make optical connections with the ES-VOA 10. The ES-VOA input fiber 12 an output fiber 18 are terminated with a fiber stub inside the fiber receptacles 32 and 34. As stated above the SFP VOA offers several advantages compared to the stand-alone ES-VOA component.

A typical industry specification for WDL on a stand-alone pigtailed ES-VOA component is 0.2 dB MAX at zero attenuation (insertion loss) and 0.8 dB MAX at 20 dB attenuation. A typical industry specification for PDL on a stand-alone pigtailed ES-VOA component is 0.15 dB MAX over 0~10 dB attenuation range and 0.30 dB MAX over 20~30 dB attenuation range. In a SFP VOA application, it is desirable that the WDL and PDL performance of the ES-VOA are similar or not substantially degraded compared to the stand-alone pigtailed ES-VOA component.

Since the fiber length in SFP VOA is approximately 30 mm and not long enough to suppress the cladding modes in a standard singlemode fiber, and the principle of ES VOA attenuation is shifting light to cladding, we considered that it may be the wavelength-dependent and polarization-dependent modal interference effects between cladding mode (coupling back into the fiber core at the fiber-to-fiber interface inside the fiber receptacle) and fundamental mode co-propagating in the fiber core, that is contributing to the PDL and WDL problems.

Given the physical constraints of the SFP housing, and depending on the exact position of the ES-VOA component inside the SFP housing, the length of the input fiber 12 and output fiber 18 is typically in the range of 15~30 mm which is much shorter than the typical 1m long pigtail of a stand-alone ES-VOA component. For the purpose of this description, we assume the fiber length to be ~20 mm as shown in FIG. 2.

Figure 3:
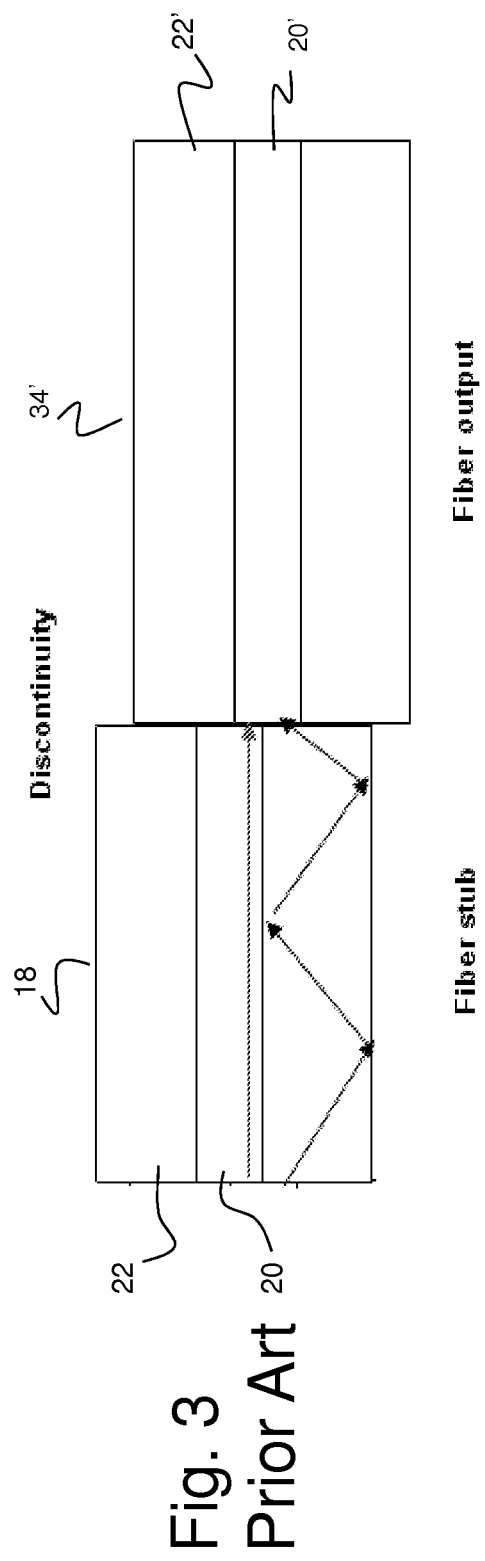
FIG. 3 is a schematic cross-section of a fiber to fiber interface at the output port of the SFP VOA of FIG. 2.

Due to assembly tolerances, there will be a small core-to-core misalignment (typically <1 um) between the external fiber core 20' and the fiber stub core 20 at the SFP optical port 34. This misalignment causes a discontinuity along the fiber core waveguide between the output fiber stub core 20 and the external fiber core 20' at the output port 34 of the SFP device, as shown in FIG. 3. Because of the short fiber length of the output fiber 18 in the SFP VOA configuration, there will remain a significant amount of cladding modes propagating next to the core 20 at the location of the fiber discontinuity, and some of the cladding modes will couple into the output fiber core 20' of the external fiber 34' at output port 34.

Figure 4:
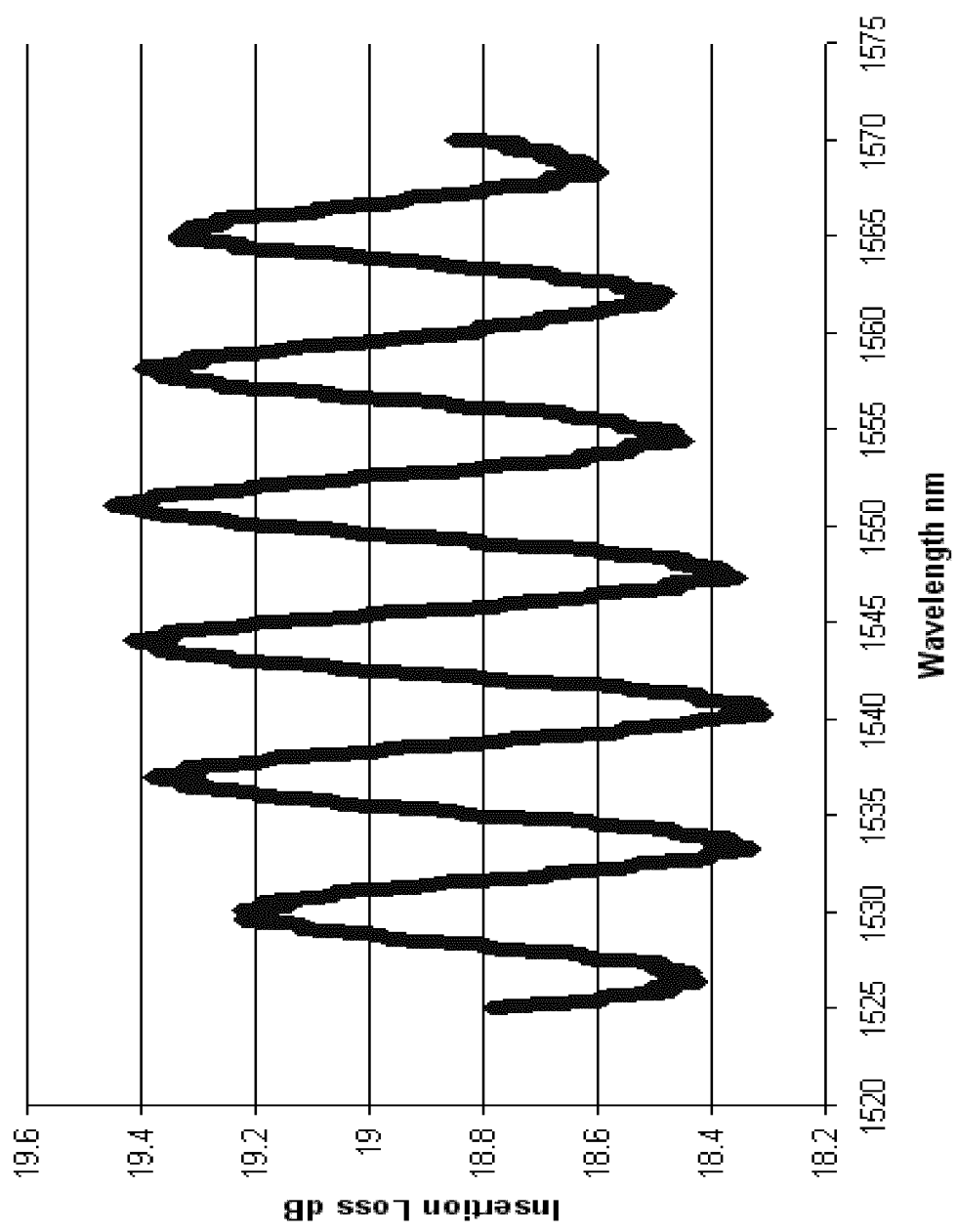
FIG. 4 is a graph of the wavelength dependent loss due to modal interference effect.

As the light propagates along the output fiber 18, a phase difference develops due to the differential propagation constants of the fundamental mode propagating in the fiber core 20 and the cladding modes propagating in the cladding region 22. At the discontinuity location, modal interference is introduced into the core 20' and is transmitted in the output fiber 34'. The phase difference will be a function of the wavelength and therefore the modal interference translates into a degradation in Wavelength Dependent Loss (WDL), as seen in FIG. 4. The amount of modal interference will also depend on the relative polarization state of the interfering modes, therefore this also translates into Polarization Dependent Loss (PDL) degradation. For example, when constructing SFP VOA prototypes using standard SMF28 fibers, we measured PDL levels above 1 dB at 20 dB attenuation. A summary of this data is provided in FIG. 6. The PDL performance measured on these prototypes are significantly worse than what is typically measured on a stand-alone pigtailed ES-VOA (which would be expected to be 0.3 dB maximum at 20 dB attenuation). Particularly at high attenuation a proportionally larger optical power exists in the cladding modes, which increases modal interference effects and translates into higher levels of PDL.

Figure 5:
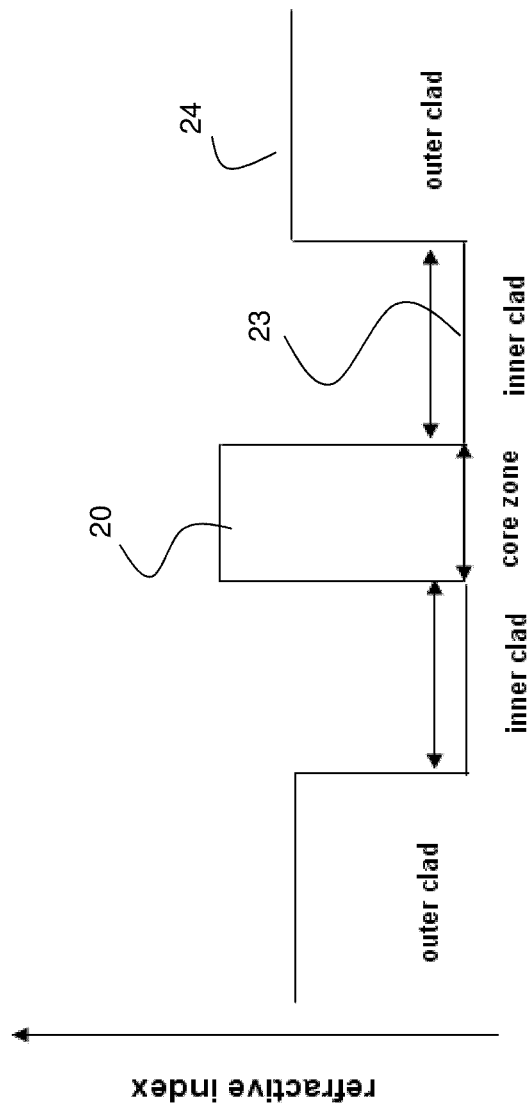
FIG. 5 is a graph of refractive indices for the core, inner cladding and outer cladding of a double clad optical fiber comprising a cladding mode suppressing fiber for use in the present invention.
Figure 9A:
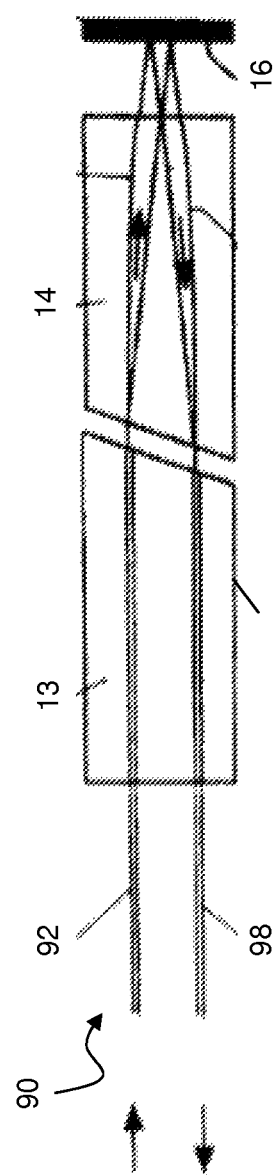
FIG. 9A is a schematic cross-section of an electrostatic variable optical attenuator in accordance with the present invention.
Figure 9B:
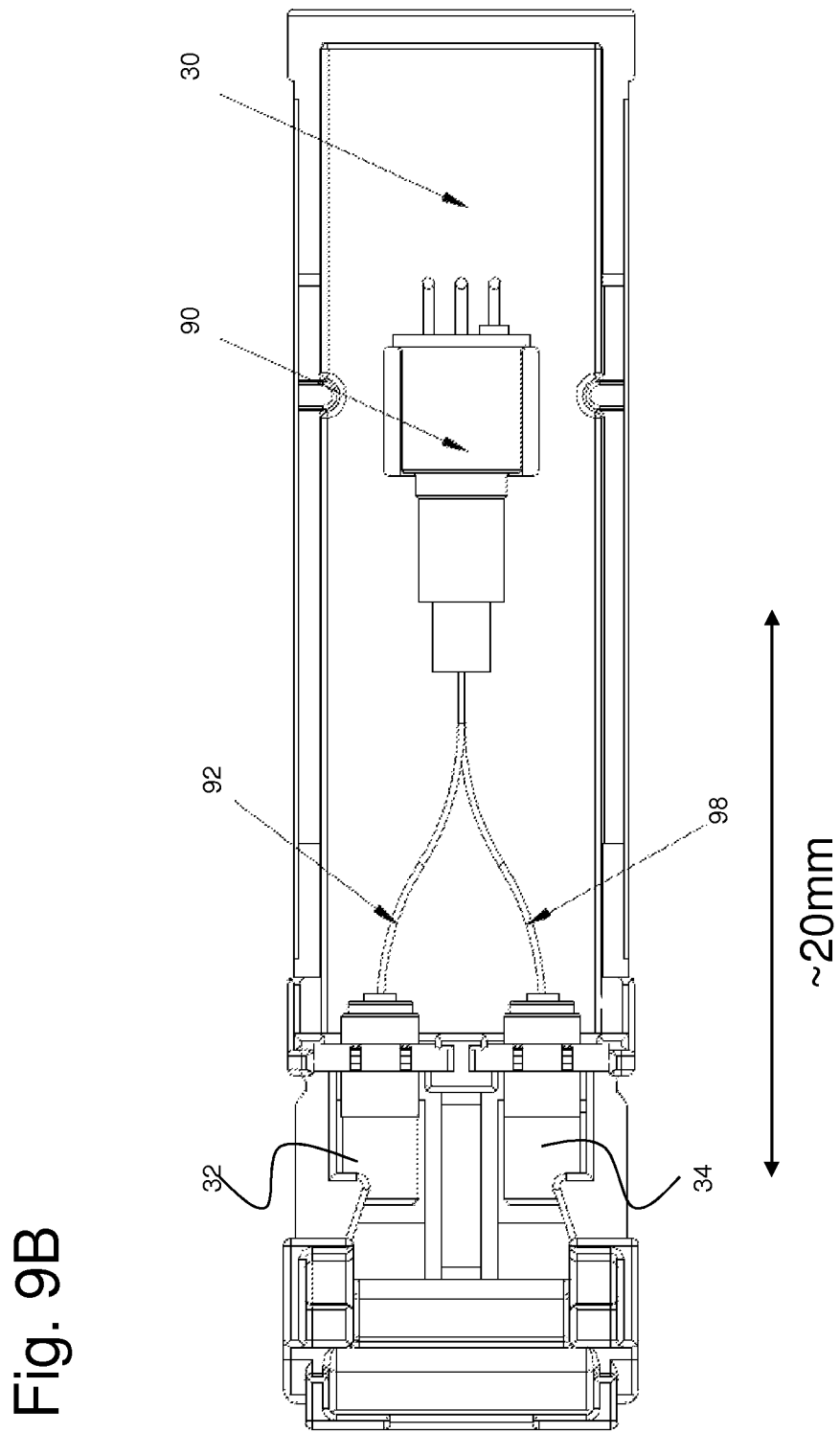
FIG. 9B is a top view of a small form factor pluggable variable optical attenuator in accordance with the present invention.

With reference to FIGS. 9A and 9B, a cladding mode suppressing fiber was used for both the input optical fiber 92 and the output optical fiber 98 of an ES-VOA component 90 in accordance with the present invention, in an effort to suppress the cladding modes in the short output optical fiber 98 and thereby improve the PDL and WDL performance of the ES-VOA component 90 packaged in a SFP housing 30. For the prototype a double clad fiber was used for both the input optical fiber and the output optical fiber. Though the optical power in the cladding of the input fiber is significantly less than in the output fiber, the input fiber is also a possible contributing source of modal interference. Hence using a cladding mode suppressing fiber for both input and output optical fibers is preferred. An example of the refractive index profile of a double clad fiber is shown in FIG. 5. In a double clad fiber, there are two cladding regions; the inner cladding 23 with lower refractive index than the fiber core 20, and the outer cladding 24 with a higher refractive index than the inner cladding 23. This refractive index profile increases the leakage of cladding modes towards the outer cladding region. This fiber design significantly reduces the modal interference problem described above. The refractive profile shown in FIG. 5 is shown as an example, the present invention is not restricted to a specific double clad fiber design. Double-clad fiber design may vary in terms of their index profile, relative index between regions and physical dimension of the core and inner clad region. The present invention will be effective with any type of fiber design that can sufficiently suppress cladding modes over the fiber length used in the application.

Cladding mode suppression fibers include fibers for which there is suppression of coupling between the fundamental low-order mode propagating in the fiber core region and the higher-order cladding modes propagating in the cladding region. In addition to double clad fiber, or multiple clad fibers, other examples of cladding mode suppression fiber include, but are not limited to: the StockerYale CMS series of low loss cladding suppression fibers; the Nufern CMF cladding mode free and CMS cladding mode suppressed series fibers; hole-assisted fiber designs disclosed in "Cladding mode coupling suppression in hole-assisted fiber BRAGG gratings", Young-Geun Han, Young Jun Lee, Gil Hwan Kim, Hung Su Cho, Ju Han Lee, Sang Bae Lee, Microwave and Optical Technology Letters, Volume 49, Issue 1, pages 74-76, January 2007; or aircore microstructure fibers such as described in "Suppression of higher-order modes in aircore microstructure fiber designs", Fini, J. M., Lasers and Electro-Optics, 2006 and 2006 Quantum Electronics and Laser Science Conference. CLEO/QELS 2006, pages 1-2, 21-26 May 2006.

Figure 8:
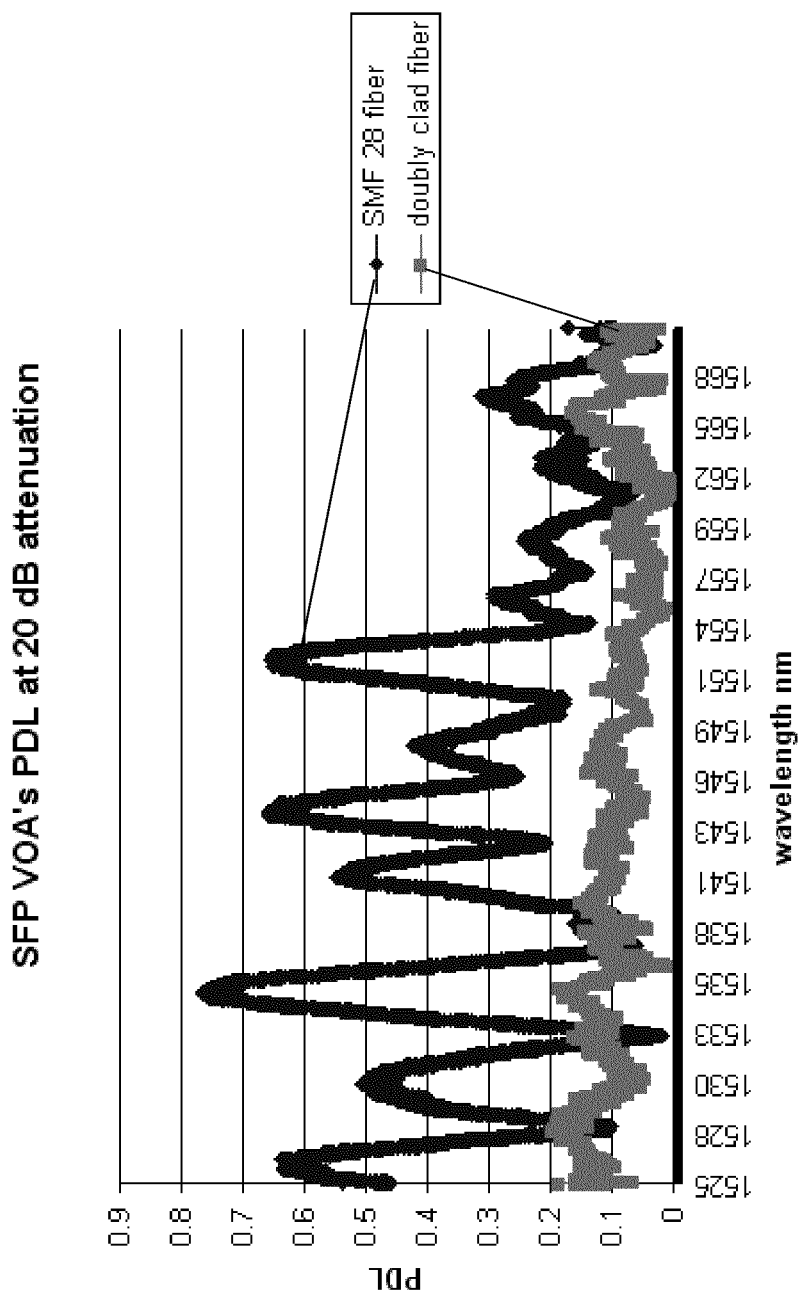
FIG. 8 is a graph of measured PDL as a function of wavelength for one SFP VOA prototype in accordance with the present invention compared to a prior art SFP VOA constructed with SMF28 fiber.

PDL data from two SFP VOA prototypes constructed with a commercially-available double clad fiber HAF-CMS, manufactured by CorActive in accordance with the present invention is shown in FIG. 7. A significant improvement is demonstrated compared to a configuration using standard SMF28 fibers, verifying the assumption of modal interference as the primary contributor of PDL degradation. Furthermore, FIG. 8 shows PDL data at 20 dB attenuation level as a function of wavelength, showing PDL and WDL in the same plot, and comparing a SFP VOA prototype constructed with standard SMF28 fibers to a prototype constructed with double clad fiber in accordance with this invention. As seen in the plot of graph in FIG. 8, both PDL and WDL at 20 dB attenuation is reduced from a peak of over 0.7 dB, to a peak of 0.2 dB.

What is claimed is:
1. A variable optical attenuator comprising:
a mirror supported to assume a variable range of positions;
a lens;
an input optical fiber for transmitting light comprising an optical signal through the lens to the mirror, wherein the input optical fiber is a cladding mode suppressing fiber, and wherein the input optical fiber is a double clad fiber and comprises a core, an inner cladding, and an outer cladding, wherein the core of the input optical fiber has a higher index of refraction than the inner cladding of the input optical fiber, and wherein the outer cladding of the input optical fiber has a higher index of refraction than the inner cladding of the input optical fiber;

an output optical fiber for receiving light reflected from the minor and focused through the lens comprising at least a core and an inner cladding, wherein the output optical fiber is a cladding mode suppressing fiber for suppressing cladding modes in the inner cladding of the output optical fiber over a length of the output optical fiber and for, thereby, reducing a polarization dependent loss and a wavelength dependent loss of the variable optical attenuator, wherein the length of the output optical fiber is greater than 15 mm and less than 100 cm; and an electro-static actuator for controlling a position of the mirror such that a selected portion of the light reflected from the minor is focused through the lens into the core of the output optical fiber, while a remaining portion of the light reflected from the minor is coupled into the inner cladding of the output optical fiber, in dependence on the position of the mirror;

wherein the variable optical attenuator is housed in a small form factor module.

2. The variable optical attenuator defined in claim 1, wherein the length of the output optical fiber is 15 mm to 60 mm.

3. The variable optical attenuator defined in claim 2, wherein the output optical fiber is a double clad fiber and further comprises an outer cladding, wherein the core of the output optical fiber has a higher index of refraction than the inner cladding of the output optical fiber, and wherein the outer cladding of the output optical fiber has a higher index of refraction than the inner cladding of the output optical fiber.

4. The variable optical attenuator defined in claim 1, wherein the mirror comprises a semiconductor micro-electromechanical device.

5. The variable optical attenuator defined in claim 4, wherein the variable optical attenuator provides an attenuation range of 0 dB to 30 dB.

* * * * *

UNITED STATES PATENT AND TRADEMARK OFFICE
CERTIFICATE OF CORRECTION

Page 1 of 2

| | |
|---|---|
| PATENT NO. | : 8,737,778 B2 |
| APPLICATION NO. | : 13/336916 |
| DATED | : May 27, 2014 |
| INVENTOR(S) | : Wang et al. |

It is certified that error appears in the above-identified patent and that said Letters Patent is hereby corrected as shown below:

In the Specification

Column 1, line 19, "a MEMS tilting minor and an"
    should read --a MEMS tilting mirror and an--

Column 1, line 24, "varying the voltage and minor tilt"
    should read --varying the voltage and mirror tilt--

Column 2, line 59, "the minor coupling into the core."
    should read --the mirror coupling into the core.--

Column 3, line 12, "reflected from the minor and"
    should read --reflected from the mirror and--

Column 3, line 15, "of the minor such that a selected"
    should read --of the mirror such that a selected--

Column 3, line 16, "minor is focused through the lens"
    should read --mirror is focused through the lens--

Column 3, line 40, "defined wherein the minor com-"
    should read --defined wherein the mirror com- --

Column 4, line 22, "a MEMS tilting minor 16"
    should read --a MEMS tilting mirror 16--

Column 4, line 24, "MEMS tilting minor 16,"
    should read --MEMS tilting mirror 16,--

Signed and Sealed this
Twenty-first Day of April, 2015

Michelle K. Lee
*Director of the United States Patent and Trademark Office*

CERTIFICATE OF CORRECTION (continued)
U.S. Pat. No. 8,737,778 B2

Column 4, line 28, "By varying the voltage and minor tilt angle,"
    should read --By varying the voltage and mirror tilt angle,--

In the Claims

Claim 1, column 7, line 9, "minor and focused through the lens"
    should read --mirror and focused through the lens--

Claim 1, column 7, line 20, "from the minor is focused through the lens"
    should read --from the mirror is focused through the lens--

Claim 1, column 7, line 22, "reflected from the minor is coupled"
    should read --reflected from the mirror is coupled--